United States Patent
Kumagai et al.

(10) Patent No.: US 11,674,688 B2
(45) Date of Patent: Jun. 13, 2023

(54) GAS TURBINE COMBUSTOR AND METHOD OF MANUFACTURING BURNER COMPONENT

(71) Applicant: Mitsubishi Heavy Industries, Ltd., Tokyo (JP)

(72) Inventors: Satoshi Kumagai, Tokyo (JP); Yoshihide Wadayama, Tokyo (JP); Shigenobu Eguchi, Yokohama (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 3 days.

(21) Appl. No.: 17/146,931

(22) Filed: Jan. 12, 2021

(65) Prior Publication Data
US 2021/0302022 A1  Sep. 30, 2021

(30) Foreign Application Priority Data

Mar. 31, 2020  (JP) .............. JP2020-061683

(51) Int. Cl.
*F23R 3/28* (2006.01)
*B22F 5/00* (2006.01)
*B33Y 80/00* (2015.01)

(52) U.S. Cl.
CPC .............. *F23R 3/286* (2013.01); *B22F 5/009* (2013.01); *B33Y 80/00* (2014.12);
(Continued)

(58) Field of Classification Search
CPC .................. B22F 5/009; B22F 2207/17; F23R 2900/00018; F23R 3/002; F23R 3/286
See application file for complete search history.

(56) References Cited

U.S. PATENT DOCUMENTS

2015/0167983 A1  6/2015  McConnaughhay et al.
2015/0239046 A1* 8/2015  McMahan .............. B23K 26/32
                                            428/548
(Continued)

FOREIGN PATENT DOCUMENTS

CN        1803348 A    7/2006
CN      104859260 A    8/2015
(Continued)

OTHER PUBLICATIONS

German-language Office Action issued in German Application No. 10 2021 200 807.0 dated Oct. 6, 2022 with English translation (13 pages).

(Continued)

*Primary Examiner* — Scott J Walthour
(74) *Attorney, Agent, or Firm* — Crowell & Moring LLP

(57) ABSTRACT

There is provided a gas turbine combustor which includes a burner component which is molded by 3D additive manufacturing and is optimized in material strength per part. The burner component includes a first part which is used within a first temperature range and/or a first stress range and a second part which is used within a second temperature range which is lower than the first temperature range and/or a second stress range which is lower than the first stress range, and a lamination speed at which a metal material is laminated on the first part by the 3D additive manufacturing is lower than a lamination speed at which the metal material is laminated on the second part.

4 Claims, 5 Drawing Sheets

(52) U.S. Cl.
CPC ...... *F05D 2230/31* (2013.01); *F05D 2240/35* (2013.01); *F05D 2260/99* (2013.01); *F23R 2900/00018* (2013.01)

(56) References Cited

U.S. PATENT DOCUMENTS

| | | |
|---|---|---|
| 2017/0248319 A1 | 8/2017 | McMahan et al. |
| 2017/0341175 A1 | 11/2017 | Ladewig et al. |

FOREIGN PATENT DOCUMENTS

| | | |
|---|---|---|
| DE | 10 2015 102 397 A1 | 8/2015 |
| DE | 10 2016 209 084 A1 | 11/2017 |
| EP | 3 025 809 B1 | 11/2017 |
| JP | 2004-142427 A | 5/2004 |
| JP | 2007-70655 A | 3/2007 |
| JP | 2017-15326 A | 1/2017 |
| JP | 2018-153820 A | 10/2018 |

OTHER PUBLICATIONS

Chinese-language Office Action issued in Chinese Application No. 202110112699.0 dated Mar. 23, 2022 with English translation (17 pages).

Chen et al., "Research Status of 3D Printing Technology", Metal World, 2018, pp. 9-14, (eight (8) pages).

Japanese-language Office Action issued in Japanese Application No. 2020-061683 dated Dec. 20, 2022 with English translation (11 pages).

Chinese-language Office Action issued in Chinese Application No. 202110112699.0 dated Dec. 2, 2022 (nine (9) pages.

\* cited by examiner

GAS TURBINE COMBUSTOR AND METHOD OF MANUFACTURING BURNER COMPONENT

CLAIM OF PRIORITY

The present application claims priority from Japanese Patent application serial no. 2020-061683, filed on Mar. 31, 2020, the content of which is hereby incorporated by reference into this application.

BACKGROUND OF THE INVENTION

The present invention pertains to a structure of a gas turbine combustor and a method of manufacturing the gas turbine combustor and, in particular, relates to a technology which is effectively applied to a structure and a manufacturing method of a burner component which is molded by a metal 3D additive manufacturing technology.

In a gas turbine, strict environmental standards are set on NOx which is exhausted in operation of the gas turbine for reducing a load that exhaust gas exerts on the environment. Since the exhaust amount of NOx is increased with the increasing temperature of flames, it is necessary to locally suppress formation of the high-temperature flames and thereby to realize uniform combustion. A complicated burner structure which realizes high dispersiveness of fuel becomes necessary for attaining the uniform combustion of the fuel.

A 3D additive manufacturing technology is proposed as measures for manufacturing the complicated burner structure. According to the 3D additive manufacturing technology, it becomes possible to manufacture a complicated structure by irradiating metal powders with laser and thereby sintering the metal powders. It is possible to realize the complicated structure which leads to improvement of dispersiveness of the fuel by applying the 3D additive manufacturing technology to manufacture of the burner structure (component).

As a background art of the technical field of the 3D additive manufacturing, there is an art such as that which is described, for example, in Japanese Unexamined Patent Application Publication No. 2017-15326. In Japanese Unexamined Patent Application Publication No. 2017-15326, "a gas turbine combustor which includes a combustion chamber into which fuel and air are supplied, a perforated plate which is located on the upstream side of the combustion chamber and in which a plurality of nozzle holes are formed in a state of being concentrically arrayed, a plurality of fuel nozzles which are arranged on the upstream sides of the respective nozzle holes in the perforated plate and supply the fuel to the combustion chamber, a fuel nozzle plate which supports the fuel nozzles and distributes the fuel which flows thereinto from the upstream side to the fuel nozzles, and a fuel nozzle unit that the plurality of fuel nozzles are integrally supported on one common base, in which the fuel nozzle unit is joined to the fuel nozzle plate" is disclosed.

In addition, that "the fuel nozzle unit 40 is produced by cutting, precision casting, 3D additive manufacturing, and so forth" is described in Japanese Unexamined Patent Application Publication No. 2017-15326 (paragraph [0028]).

SUMMARY OF THE INVENTION

Although the 3D additive manufacturing makes it possible to manufacture the complicated structure, the 3D additive manufacturing has such problems that time is taken for lamination and a cost is increased. Although it is possible to reduce the time taken for lamination by increasing a scanning speed of the laser and laser output power in a case where metal powders are sintered, such a problem arises that a relative density of the material is reduced in this case. Since also the material strength is reduced with reducing the relative density, in general, a lamination condition for sufficiently increasing the relative density is adopted and thereby the time taken for lamination is increased.

In a burner structure, there exist a part which is high in temperature and/or stress to be exerted thereon and therefore is requested to have a high material strength and a part which is low in temperature and/or stress to be exerted thereon and therefore is not requested to have the high material strength. Accordingly, it is not necessary for the entire burner to be high in strength and it is possible to optimize the strength per part.

Nothing is described about the problems of the 3D additive manufacturing such as the above and solutions to these problems in Japanese Unexamined Patent Application Publication No. 2017-15326.

Accordingly, the present invention aims to provide a gas turbine combustor which includes a burner component that the material strength is optimized per part, in the gas turbine combustor which includes the burner component which is molded by the 3D additive manufacturing.

In addition, the present invention also aims to provide a method of manufacturing a burner component which makes it possible to manufacture the burner component that the material strength is optimized per part in a comparatively short time period in the method of manufacturing the burner component by the 3D additive manufacturing.

In order to solve the abovementioned problems, according to one aspect of the present invention, there is provided a gas turbine combustor including a burner component which is molded by 3D additive manufacturing, in which the burner component includes a first part which is used within a first temperature range and/or a first stress range and a second part which is used within a second temperature range which is lower than the first temperature range and/or a second stress range which is lower than the first stress range, and a lamination speed at which a metal material is laminated on the first part by the 3D additive manufacturing is lower than a lamination speed at which the metal material is laminated on the second part.

According to another aspect of the present invention, there is provided a method of manufacturing a burner component by 3D additive manufacturing, including the steps of (a) laminating a metal material on a first part which is used within a high-temperature range and/or a high-stress range of the burner component at a first lamination speed and (b) laminating the metal material on a second part which is used within a temperature range and/or a stress range which is/are lower than the temperature range and/or the stress range of the first part at a second lamination speed which is higher than the first lamination speed.

According to the present invention, it become possible to realize the gas turbine combustor which includes the burner component that the material strength is optimized per part, in the gas turbine combustor which includes the burner component which is molded by the 3D additive manufacturing.

In addition, it becomes also possible to realize the method of manufacturing the burner component which makes it possible to manufacture the burner component that the material strength is optimized per part in the comparatively short time period, in the method of manufacturing the burner component by the 3D additive manufacturing.

Accordingly, it becomes possible to provide the gas turbine combustor which is high in environmental performance and cost advantage.

Problems, configurations and effects other than the above will become apparent from the following description of embodiments.

DETAILED DESCRIPTION OF THE PREFERRED EMBODIMENTS

In the following, embodiments of the present invention will be described with reference to the appended drawings. Incidentally, the same numerals are assigned to the constitutional elements having the same configurations and detailed description of duplicated parts is omitted.

Figure 1:
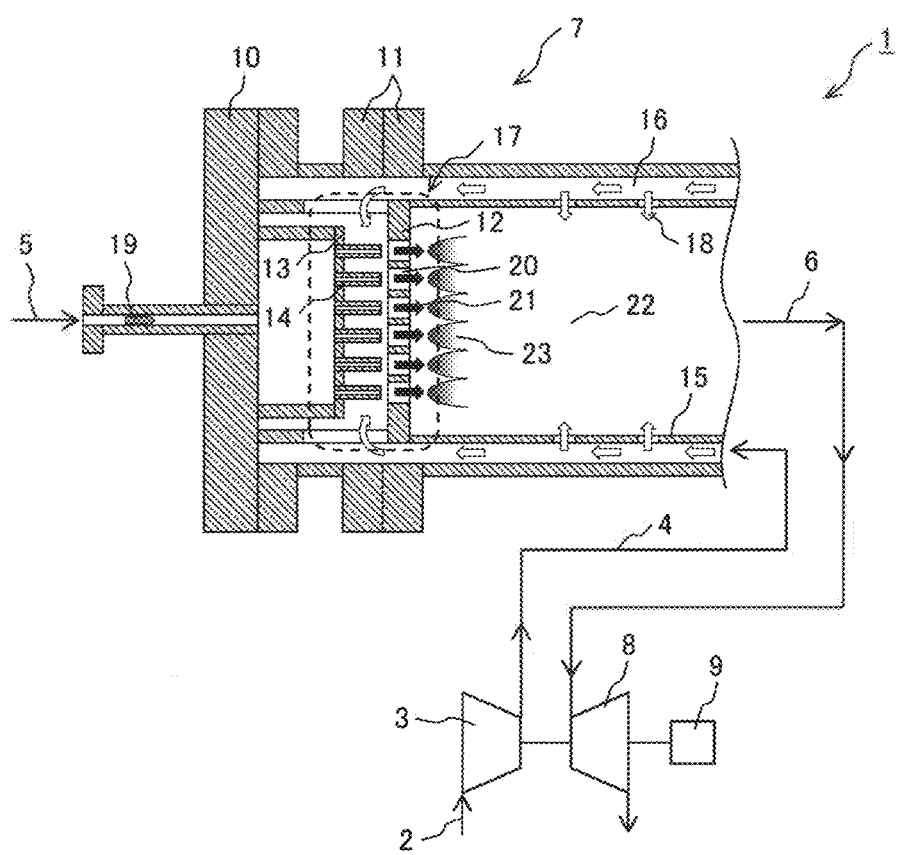
FIG. 1. is a sectional diagram illustrating one example of a schematic configuration of a gas turbine combustor according to one embodiment of the present invention.
Figure 2:
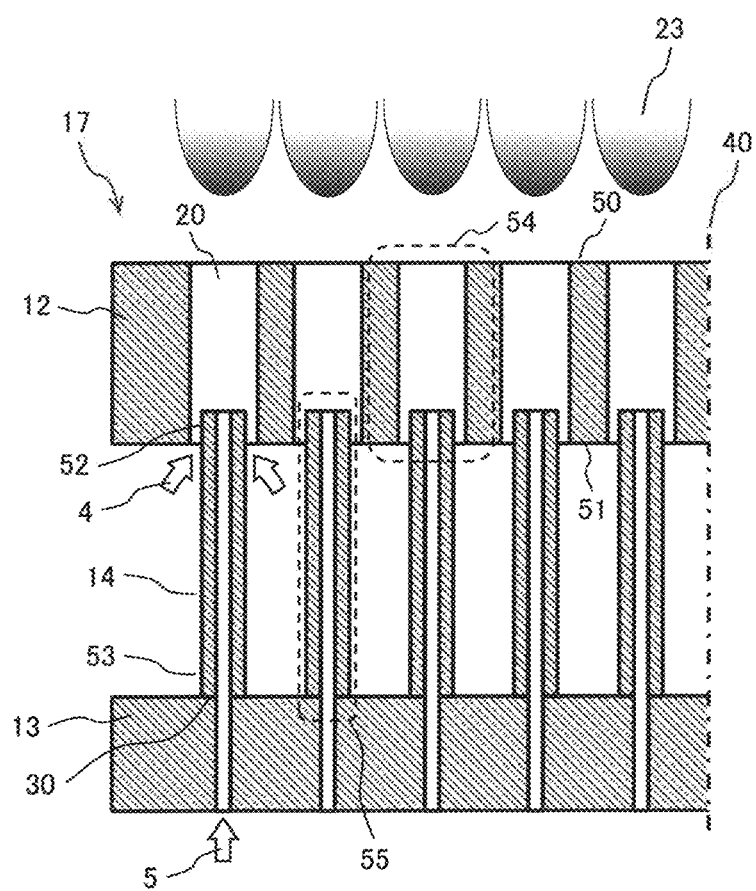
FIG. 2 is an enlarged diagram illustrating one example of a burner 17 in FIG. 1.

First, a gas turbine combustor which becomes the subject of the present invention will be described with reference to FIG. 1 and FIG. 2. FIG. 1 is a sectional diagram illustrating one example of a schematic configuration of a gas turbine combustor according to one embodiment of the present invention. In FIG. 1, the gas turbine combustor is illustrated as a gas turbine plant 1 which includes a compressor 3, a gas turbine 8 and a generator 9. FIG. 2 is an enlarged diagram illustrating one example of a burner 17 in FIG. 1.

As illustrated in FIG. 1, the gas turbine plant 1 includes the compressor 3 which takes in air 2 from the atmosphere and compresses the air 2, a combustor 7 which mixes compressed air 4 which is compressed in the compressor 3 with fuel 5, burns the fuel 5 with the compressed air 3 and generates a high-temperature and high-pressure combustion gas 6, the gas turbine 8 which is driven with the combustion gas 6 which is generated in the combustor 7 and takes out energy of the combustion gas 6 as rotational power and the generator 9 which generates electricity by using the rotational power of the gas turbine 8.

In FIG. 1, a structure which includes an end flange 10, an external cylinder 11, a perforated plate 12, a fuel nozzle plate 13, fuel nozzles 14 and a liner 15 is illustrated in FIG. 1 as one example of the combustor 7. However, the present invention is also applicable to combustors of various structures, not limited to the combustor 7 in FIG. 1.

The compressed air 4 which is compressed by the compressor 3 passes through a flow path 16 which is formed between the external cylinder 11 and the liner 15 and flows into the burner 17. Part of the compressed air 4 flows into the liner 15 as cooling air 18 for cooling the liner 15.

The fuel 5 passes through a fuel feed pipe 19 in an end flange 10, flows into the fuel nozzle plate 13, passes through the respective fuel nozzles 14, and is injected to the perforated plate 12. The fuel 5 which is injected from the fuel nozzles 14 and the compressed air 4 are mixed together at fuel-nozzle-side inlet ports of nozzle holes 20 in the perforated plate 12, and an air-fuel mixture 21 of the fuel 5 and the compressed air 4 is injected toward a combustion chamber 22 and forms flames 23.

Incidentally, it is possible for the combustor 7 according to the present invention to use fuels such as coke oven gas, refinery off-gas, coal gasified gas, and so forth, not limited to natural gas.

FIG. 2 is an enlarged diagram illustrating one example of the burner 17 in FIG. 1. FIG. 2 illustrates the enlarged diagram of an upper half part of the burner 17. The burner 17 includes the perforated plate 12, the fuel nozzle plate 13, and the fuel nozzles 14. Central axes 40 of the perforated plate 12 and the fuel nozzle plate 13 match each other. An upstream-side end 30 of each fuel nozzle 14 is metallurgically bonded to the fuel nozzle plate 13 and a bonded part between the upstream-side end 30 and the fuel nozzle plate 13 is sealed so as to avoid leakage of the fuel 5.

A leading end 52 of each fuel nozzle is not in contact with each nozzle hole 20 in the perforated plate 12 and therefore it is possible for the compressed air 4 to freely flow into the nozzle holes 20. In general, welding, brazing and so forth are utilized as a method of bonding the up-stream side ends 30 of the fuel nozzles 14 to the fuel nozzle plate 13.

First Embodiment

Next, a structure and a manufacturing method of a burner component according to the first embodiment of the present invention will be described with reference to FIG. 3 and FIG. 4. In the first embodiment, the perforated plate 12 will be described as one example of the burner component.

Figure 3:
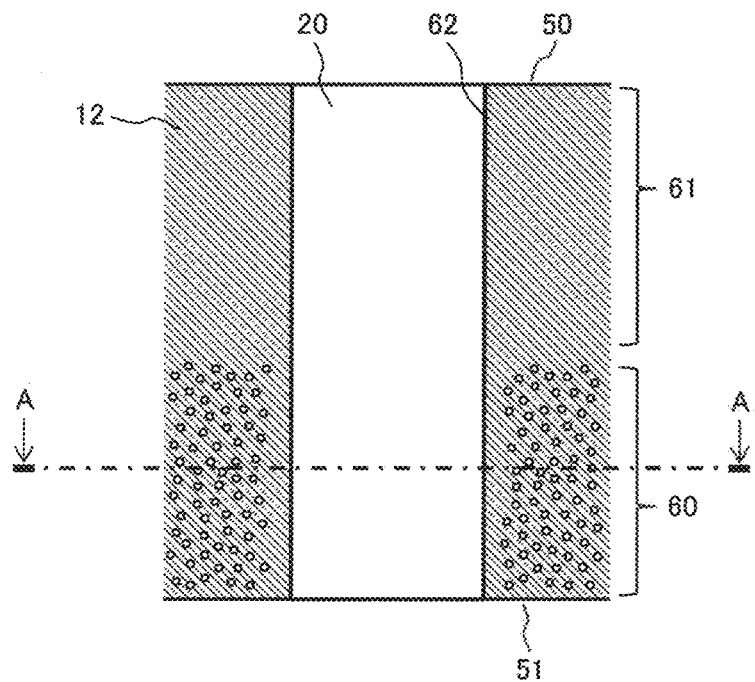
FIG. 3 is a diagram conceptually illustrating one example of one metal material relative density distribution on a perforated plate according to a first embodiment of the present invention.

FIG. 3 illustrates one example of one metal material relative density distribution on the perforated plate 12 in the first embodiment. FIG. 3 is an enlarged diagram illustrating one example of a part 54 of the perforated plate 12 which is illustrated in FIG. 2. Since a downstream-side end face 50 of the perforated plate 12 is heated with radiant heat and so forth of the flames 23, a region 61 which is close to the downstream-side end face 50 of the perforated plate 12 reaches a high temperature. On the other hand, an upstream-side end face 51 of the perforated plate 12 and an inner face 62 of each nozzle hole 20 are cooled with the compressed air 4 and therefore become lower in temperature than the downstream-side end face 50.

Thermal stress is generated in the region 61 due to a difference in temperature between the downstream-side end face 50 and the upstream-side end face 51 and a difference in temperature between the downstream-side end face 50 and the inner face 62 of each nozzle hole 20. Accordingly, the region 61 is high in temperature and the thermal stress is generated in the region 61 and therefore the region 61 is requested to be high in material strength. On the other hand, a region 60 which is close to the upstream-side end face 51 of the perforated plate 12 is low in temperature and stress, the region 60 is not requested to be high in material strength.

Figure 4:
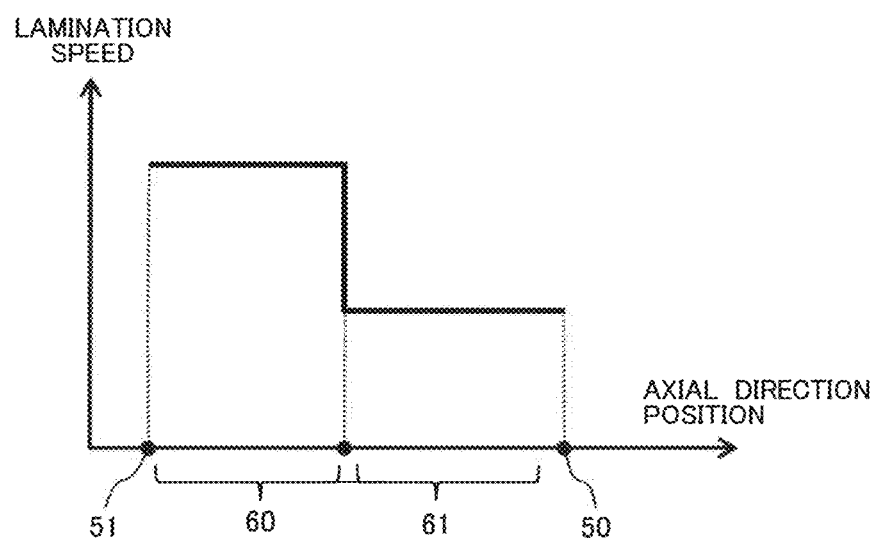
FIG. 4 is a diagram illustrating one example of one relation between an axial-direction position and a lamination speed of the perforated plate according to the first embodiment of the present invention.

Accordingly, in the first embodiment, the perforated plate 12 is manufactured in such a manner that the metal material relative density of the region 61 of the perforated plate 12 is increased by reducing a lamination speed at which the metal material is laminated on the region 61 by the 3D additive manufacturing and thereby priority is given to the material strength as illustrated in FIG. 4. On the other hand, the perforated plate 12 is also manufactured in such a manner that the lamination speed at which the metal material is laminated on the region 60 is increased and thereby priority is given to manufacturing time and cost. Thereby, it becomes possible to realize a manufacturing method that the material strength and the manufacturing cost are optimized per part of the perforated plate 12.

A selection example of the lamination speed of a low-temperature and low-stress part is indicated in Table 1. An allowable stress which is attained in a case where the lamination speed is low (about 0.1 kg/h) is about 600 MPa. On the other hand, in a case where the lamination speed is high (about 0.2 kg/h), the allowable stress is reduced to about 400 MPa with reducing the metal material relative density. However, an applied stress is about 300 MPa and is lower than the allowable stress (about 400 MPa) which is attained in a case where the lamination speed is high. Accordingly, manufacturing in which the lamination speed is increased and thereby priority is given to the manufacturing time and cost becomes possible.

TABLE 1

| Lamination Speed | Relative Density | Metal temperature | Allowable Stress | Applied stress | Result of Evaluation |
|---|---|---|---|---|---|
| High (0.2 kg/h) | 95% | 400° C. | 400 MPa | 300 MPa | ○ (Strength is established) |
| Low (0.1 kg/h) | 99% | 400° C. | 600 MPa | 300 MPa | X (Manufacturing cost is high) |

A selection example of the lamination speed of a high-temperature and high-stress part is indicated in Table 2. In a case where the lamination speed is low (about 0.1 kg/h), the allowable stress is about 500 MPa. On the other hand, in a case where the lamination speed is high (about 0.2 kg/h), the allowable stress is reduced to about 300 MPa with reducing the metal material relative density. Since the metal temperature is about 600° C. and is higher than about 400° C. of the metal temperature of the low-temperature and low-stress part, the allowable stresses which correspond to the high and low lamination speeds are lower than the allowable stresses in Table 1. The applied stress is about 400 MPa and is higher than the allowable stress (about 300 MPa) which is attained in a case where the lamination speed is high. Accordingly, it is necessary to perform manufacturing that the lamination speed is reduced and thereby priority is given to the material strength.

TABLE 2

| Lamination Speed | Relative Density | Metal temperature | Allowable Stress | Applied stress | Result of Evaluation |
|---|---|---|---|---|---|
| High (0.2 kg/h) | 95% | 600° C. | 300 MPa | 400 MPa | x (strength is not established) |
| Low (0.1 kg/h) | 99% | 600° C. | 500 MPa | 400 MPa | ○ (strength is established) |

However, each relation between each lamination speed and each characteristic which is indicated in Table 1 and Table 2 is a representative example, and the present invention is also applicable to examples other than the above-mentioned representative examples.

In addition, although as the metal material to be laminated by the 3D additive manufacturing, a high-temperature material such as a nickel (Ni)-chromium (Cr)-ion (Fe) alloy which is registered under the name of, for example, Inconel 718 (registered trademark) or the like is conceived of, the present invention is applicable to a wide range of metal materials.

As described above, the burner component of the first embodiment has the first part (the region 61) which is used within the first temperature (high temperature) range and/or the first stress (high stress) range and the second part (the region 60) which is used within the second temperature (low temperature) range which is lower than the first temperature (high temperature) range and/or the second stress (low stress) range which is lower than the first stress (high stress) range. The lamination speed at which the metal material is laminated on the first part (the region 61) by the 3D additive manufacturing is lower than the lamination speed at which the metal material is laminated on the second part (the second region 60).

Then, the relative density of the metal material on the first part (the region 61) is higher than the relative density of the metal material on the second part (the region 60).

Thereby, it becomes possible to realize the gas turbine combustor which includes the burner component that the material strength is optimized per part in the gas turbine combustor which includes the burner component which is molded by the 3D additive manufacturing.

In addition, a method of manufacturing the burner component according to the first embodiment includes the steps of (a) laminating the metal material on the first part which is used within the high-temperature and/or high-stress range of the burner component at the first lamination speed and (b) laminating the metal material on the second part which is used within the range which is lower in temperature and/or stress than the range of the first part at the second lamination speed which is higher than the first lamination speed, in the method of manufacturing the burner component by the 3D additive manufacturing.

Thereby, it becomes possible to realize the burner component manufacturing method which makes it possible to manufacture the burner component for which the material strength is optimized per part in the comparatively short period of time, in the burner component manufacturing method by the 3D additive manufacturing.

Second Embodiment

A structure and a manufacturing method of the burner component according to the second embodiment of the present invention will be described with reference to FIG. 5 and FIG. 6. In the second embodiment, the perforated plate 12 will be described as one example of the burner component similarly to the first embodiment.

Figure 5:
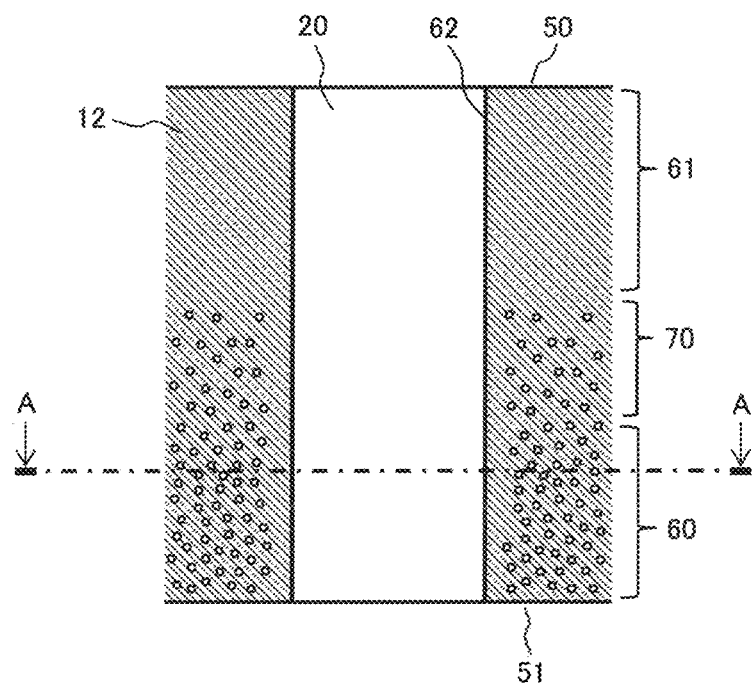
FIG. 5 is a diagram conceptually illustrating one example of another metal material relative density distribution on the perforated plate according to a second embodiment of the present invention.

FIG. 5 illustrates one example of another metal material relative density distribution of the perforated plate 12 in the second embodiment. FIG. 5 is a diagram in which a lamination speed transition region 70 is added to the diagram in FIG. 3. In the manufacturing method according to the first embodiment in FIG. 4, the lamination speeds of the region 60 and the region 61 are mutually switched discontinuously. However, in a case where discontinuous switching of the lamination speeds is impossible due to control of a manufacturing device or in a case where the material strength is reduced by discontinuous switching of the lamination speeds, it is possible to dispose the transition region 70 by a manufacturing method which is illustrated in FIG. 6.

Figure 6:
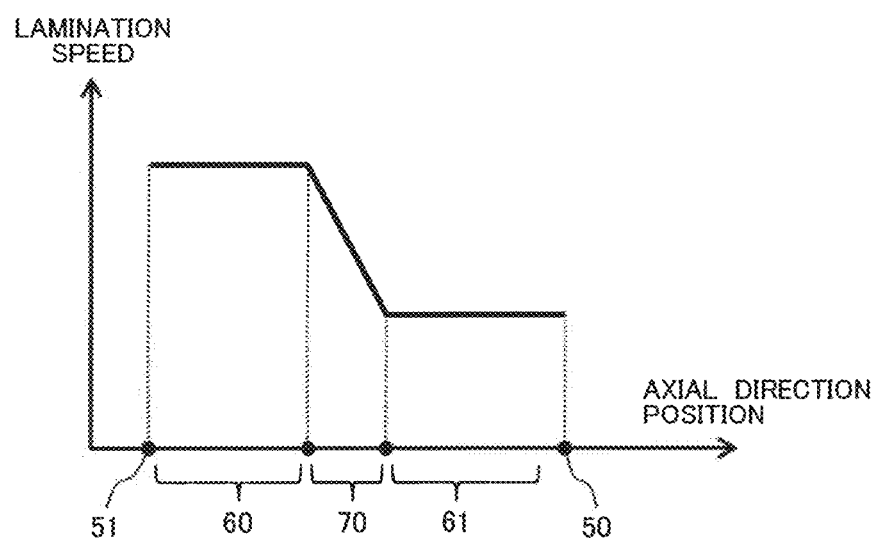
FIG. 6 is a diagram illustrating one example of another relation between the axial-direction position and the lamination speed of the perforated plate according to the second embodiment of the present invention.

That is, as illustrated in FIG. 6, it becomes possible to mutually switch the lamination speeds continuously by disposing the transition region 70.

Third Embodiment

A structure and a manufacturing method of the burner component according to the third embodiment of the present invention will be described with reference to FIG. 7. In the third embodiment, the perforated plate 12 will be described as one example of the burner component similarly to the first embodiment and the second embodiment.

Figure 7:
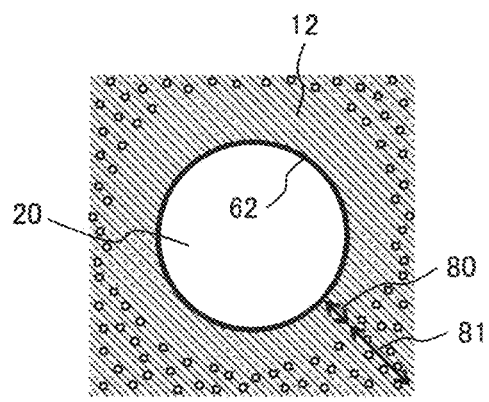
FIG. 7 is a diagram conceptually illustrating one example of still another metal material relative density distribution on an adjacent part of a nozzle hole in the perforated plate according to a third embodiment of the present invention.

FIG. 7 illustrates one example of still another metal material relative density distribution on a part 80 which is adjacent to the inner face 62 of each nozzle hole 20 in the perforated plate 12 in the third embodiment. In addition, FIG. 7 is a sectional diagram taken along the A-A line in FIG. 3 or FIG. 5. Since the inner face 62 of each nozzle hole 20 is cooled with the compressed air 4, thermal stress generates in the adjacent part 80 of the inner face 62 of each nozzle hole 20.

Accordingly, in the third embodiment, the perforated plate 12 is manufactured in such a manner that the lamination speed of the metal material on the adjacent part 80 of the inner face 62 is made lower than the lamination speed of the metal material on a region 81 where the thermal stress is reduced and thereby priority is given to the material strength of the adjacent part 80 of the inner face 62. The perforated plate 12 is also manufactured in such a manner that, on the other hand, on the region 81 where the thermal stress is reduced, the lamination speed of the metal material is made higher than the lamination speed of the metal material on the adjacent part 80 of the inner face 62 and thereby the manufacturing time and cost are reduced.

That is, the lamination speed of the metal material on the adjacent part 80 of the inner face 62 of each nozzle hole 20 which is formed in the perforated plate 12 is lower than the lamination speed of the metal material on the region 81 which is located outside the adjacent part 80.

Fourth Embodiment

A structure and a manufacturing method of the burner component according to the fourth embodiment of the present invention will be described with reference to FIG. 8 and FIG. 9. In the fourth embodiment, one of the fuel nozzles 14 will be described as one example of the burner component.

Figure 8:
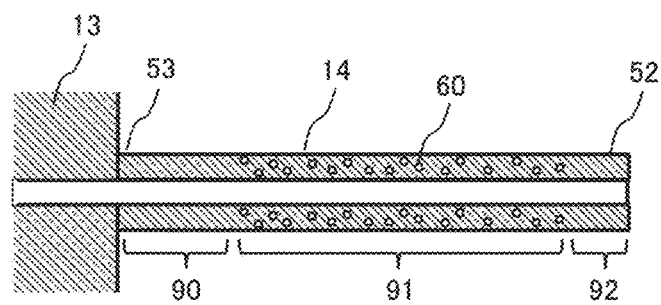
FIG. 8 is a diagram conceptually illustrating one example of yet another metal material relative density distribution on the fuel nozzle according to a fourth embodiment of the present invention.

FIG. 8 illustrates one example of yet another metal material relative density distribution of the fuel nozzle 14 in the fourth embodiment. FIG. 8 is an enlarged diagram illustrating one example of a part 55 of the fuel nozzle 14 in FIG. 2. The fuel nozzle 14 has a cantilever structure in which the fuel nozzle 14 is supported to the fuel nozzle plate 13 at a root 53.

There are cases where a vibration is generated in the fuel nozzle 14 under the influence of the compressed air 4 which flows around the fuel nozzle 14 and the vibration of the fuel nozzle plate 13. In general, vibration stress is maximized on the root 53. In addition, there are cases where the temperature is increased on the leading-end 52 of the fuel nozzle 14 under the influence of radiant heat of the flames 23.

Accordingly, it is necessary to increase the material strength of a region 90 and a region 92 of the fuel nozzle 14 by taking the vibration stress and the radiant heat of the flames 23 into consideration. On the other hand, since a region 91 is low in vibration stress and temperature, no problem occurs on the region 91 even in a case where the material strength thereof is low.

Figure 9:
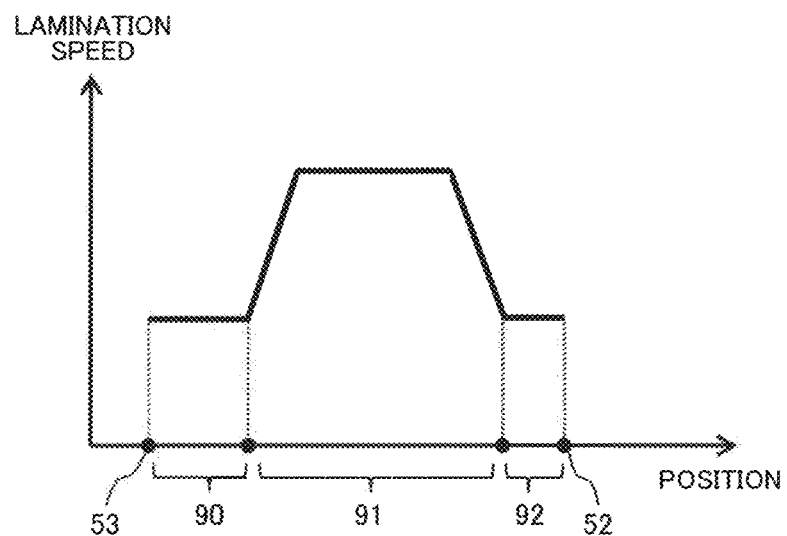
FIG. 9 is a diagram illustrating one example of a relation between the position and the lamination speed of the fuel nozzle according to the fourth embodiment of the present invention.

Accordingly, in the fourth embodiment, the fuel nozzle 14 is manufactured in such a manner that the lamination speeds of the metal material on the region 90 and the region 92 of the fuel nozzle 14 are reduced as illustrated in FIG. 9 and thereby priority is given to the material strength. The fuel nozzle 14 is also manufactured in such a manner that, on the other hand, on the region 91, the lamination speed of the metal material is increased and thereby priority is given to the manufacturing time and cost. Thereby, it becomes possible to realize the manufacturing method that the material strength and the manufacturing cost are optimized per part of the fuel nozzle 14.

That is, the lamination speeds of the metal material on the root-side part (the region 90) and the leading-end-side part (the region 92) of the fuel nozzle 14 are lower than the lamination speed of the metal material on the region 91 between the root-side part (the region 90) and the leading-end-side part (the region 92).

Incidentally, the present invention is not limited to the abovementioned embodiments, and various modified example are included. For example, the abovementioned embodiments are described in detail for supporting better understanding of the present invention, and the present invention is not necessarily limited to the embodiment which includes all the configurations which are described above. In addition, it is also possible to replace one configuration of one embodiment with one configuration of another embodiment. In addition, it is also possible to add one configuration of another embodiment to one configuration of one embodiment. In addition, it is possible to add/delete/replace one configuration of each embodiment to/from/with another configuration of each embodiment.

REFERENCE SIGNS LIST

1: gas turbine plant
2: air
3: compressor
4: compressed air
5: fuel
6: combustion gas
7: combustor
8: gas turbine 9: generator
10: end flange
11: external cylinder
12: perforated plate
13: fuel nozzle plate
14: fuel nozzle
15: liner
16: flow path
17: burner
18: cooling air
19: fuel feed pipe
20: nozzle hole
21: air-fuel mixture
22: combustion chamber
23: flame
30: upstream-side end of (fuel nozzle 14)
40: central axes 40 (of perforated plate 12 and fuel nozzle plate 13)
50: downstream-side end face (of perforated plate 12)
51: upstream-side end face (of perforated plate 12)
52: leading-end (of fuel nozzle 14)
53: root (of fuel nozzle 14)
54: part 54 of perforated plate 12
55: part 55 of fuel nozzle 14
60: region (where lamination speed of perforated plate 12 is high)
61: region (where lamination speed of perforated plate 12 is low)
62: inner face (of nozzle hole 20)
70: (lamination speed) transition region
80: part which is adjacent to inner face 62 (of nozzle hole 20)
81: region (where thermal stress is reduced)
90: region (where lamination speed of fuel nozzle 14 is low)
91: region (where lamination speed of fuel nozzle 14 is high)
92: region (where lamination speed of fuel nozzle 14 is low)

What is claimed is:

1. A method of manufacturing a gas turbine combustor, the gas turbine combustor comprising a burner component which is molded by 3D additive manufacturing, wherein the burner component includes a first part which is molded from a metal material at a first lamination speed and used within a first temperature range and/or a first stress range, and a second part which is molded from the metal material at a second lamination speed that is faster than the first lamination speed and used within a second temperature range which is lower than the first temperature range and/or a second stress range which is lower than the first stress range, the burner component further comprising a transition region which is molded from the metal material by a continuous linear decrease in lamination speed from the first lamination to the second lamination speed, the transition region being located between the first part and the second part, which produces a continuous linear decrease in a density of the metal material in the transition region from the density of the metal material of the first part to the density of the metal material of the second part, and the density of the metal material of the first part is higher than the density of the metal material of the second part, wherein the burner component is a perforated plate which mixes fuel with air, and wherein the first part is located on a flame side of the perforated plate and includes a flame side end surface of the perforated plate, and the second part is located on the side which is opposite to the flame side of the perforated plate and includes an opposite side end surface of the perforated plate, the opposite side end surface being opposed to the flame side end surface of the perforated plate, the method comprising the steps of:
    (a) laminating the metal material on the first part at the first lamination speed; and
    (b) laminating the metal material on the second part at the second lamination speed.

2. The method of manufacturing the burner component according to claim 1, wherein a lamination speed at which the metal material is laminated on a part which is adjacent to an inner face of a nozzle hole which is formed in the perforated plate is lower than a lamination speed at which the metal material is laminated on a region which is located outside the part which is adjacent to the inner face of the nozzle hole.

3. A gas turbine combustor comprising:
    a burner component which is molded by 3D additive manufacturing, wherein the burner component includes:
        a first part which is molded from a metal material at a first lamination speed and used within a first temperature range and/or a first stress range;
        a second part which is molded from the metal material at a second lamination speed that is faster than the first lamination speed and used within a second temperature range which is lower than the first temperature range and/or a second stress range which is lower than the first stress range; and
        a transition region which is molded from the metal material by a continuous linear decrease in lamination speed from the first lamination to the second lamination speed, the transition region being located between the first part and the second part, which produces a continuous linear decrease in a density of the metal material in the transition region from the density of the metal material of the first part to the density of the metal material of the second part,
    wherein the density of the metal material of the first part is higher than the density of the metal material of the second part,
    wherein the burner component is a perforated plate which mixes fuel with air, and
    wherein the first part is located on a flame side of the perforated plate and includes a flame side end surface of the perforated plate, and the second part is located on the side which is opposite to the flame side of the perforated plate and includes an opposite side end surface of the perforated plate, the opposite side end surface being opposed to the flame side end surface of the perforated plate.

4. The gas turbine combustor according to claim 3, wherein a lamination speed at which the metal material is laminated on a part which is adjacent to an inner face of a nozzle hole which is formed in the perforated plate is lower than a lamination speed at which the metal material is laminated on a region which is located outside the part which is adjacent to the inner face of the nozzle hole.

* * * * *